United States Patent
Zappatore

(10) Patent No.: US 11,597,099 B2
(45) Date of Patent: Mar. 7, 2023

(54) UNDERACTUATED ROBOTIC HAND

(71) Applicant: BionIT Labs S.r.l., Lecce (IT)

(72) Inventor: Giovanni Antonio Zappatore, Lecce (IT)

(73) Assignee: BionIT Labs S.r.l., Lecce (IT)

( * ) Notice: Subject to any disclaimer, the term of this patent is extended or adjusted under 35 U.S.C. 154(b) by 999 days.

(21) Appl. No.: 16/341,730

(22) PCT Filed: Nov. 29, 2017

(86) PCT No.: PCT/IB2017/057477
§ 371 (c)(1),
(2) Date: Apr. 12, 2019

(87) PCT Pub. No.: WO2018/100500
PCT Pub. Date: Jun. 7, 2018

(65) Prior Publication Data
US 2020/0047351 A1  Feb. 13, 2020

(30) Foreign Application Priority Data

Nov. 29, 2016  (IT) ........................ 102016000120646

(51) Int. Cl.
*B25J 15/00* (2006.01)
*B25J 15/02* (2006.01)
*B25J 15/08* (2006.01)

(52) U.S. Cl.
CPC ....... *B25J 15/0009* (2013.01); *B25J 15/0213* (2013.01); *B25J 15/08* (2013.01)

(58) Field of Classification Search
CPC ..... B25J 15/0009; B25J 15/0213; B25J 15/08
See application file for complete search history.

(56) References Cited

U.S. PATENT DOCUMENTS

| 5,062,673 A | * | 11/1991 | Mimura | ............... B25J 15/0009 623/64 |
| 5,447,403 A | * | 9/1995 | Engler, Jr. | ........... B25J 15/0009 294/111 |

(Continued)

OTHER PUBLICATIONS

Zappatore, G.A., Reina, G., Messina, A. (2017). Adam's Hand: An Underactuated Robotic End-Effector. In: Boschetti, G., Gasparetto, A. (eds) Advances in Italian Mechanism Science. Mechanisms and Machine Science, vol. 47. Springer, Cham, https://doi.org/10.1007/978-3-319-48375-7_26 (Year: 2017).*

(Continued)

*Primary Examiner* — Stephen A Vu
(74) *Attorney, Agent, or Firm* — R. Ruschena Patent Agent, LLC

(57) ABSTRACT

Anthropomorphic hand comprising: a palm; a metacarpus; a thumb; four aligned fingers constrained to said palm, each comprising a proximal phalanx, a middle phalanx and a distal phalanx; a motor; a plurality of differential stages which transmit motion from said motor to said aligned fingers and to said thumb: a first stage whose planet carrier is moved by said motor and whose sun gears move planet carriers of a second and a fifth stage, sun gears of the second and fifth stages being integral to the planet carriers of a third and a fourth stage, whose sun gears move four gears having axes coincident with the axes of rotation between the aligned fingers and the palm; sun gears of the fifth stage being configured to rotate said metacarpus and a gear having axis coincident with the axis of rotation between the proximal phalanx of the thumb and the metacarpus.

13 Claims, 10 Drawing Sheets

(56) References Cited

U.S. PATENT DOCUMENTS

| | | | | |
|---|---|---|---|---|
| 8,936,289 | B1* | 1/2015 | Kozlowski | B25J 15/12 |
| | | | | 901/45 |
| 9,492,928 | B2* | 11/2016 | Moore | B25J 15/0009 |
| 9,545,727 | B1* | 1/2017 | Shamlian | B25J 15/0009 |
| 2003/0090115 | A1* | 5/2003 | Kim | B25J 15/10 |
| | | | | 294/106 |

OTHER PUBLICATIONS https://link.springer.eom/chapter/10.1007/978-3-319-48375-7_26#chapter-info.*

* cited by examiner

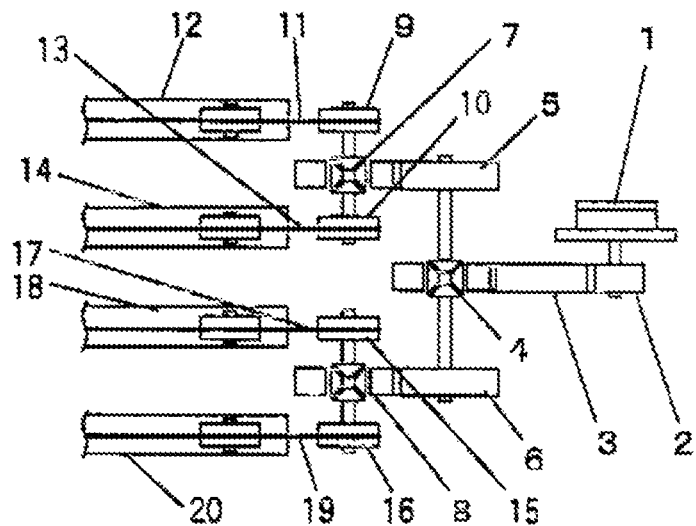
Fig. 1 – Prior art
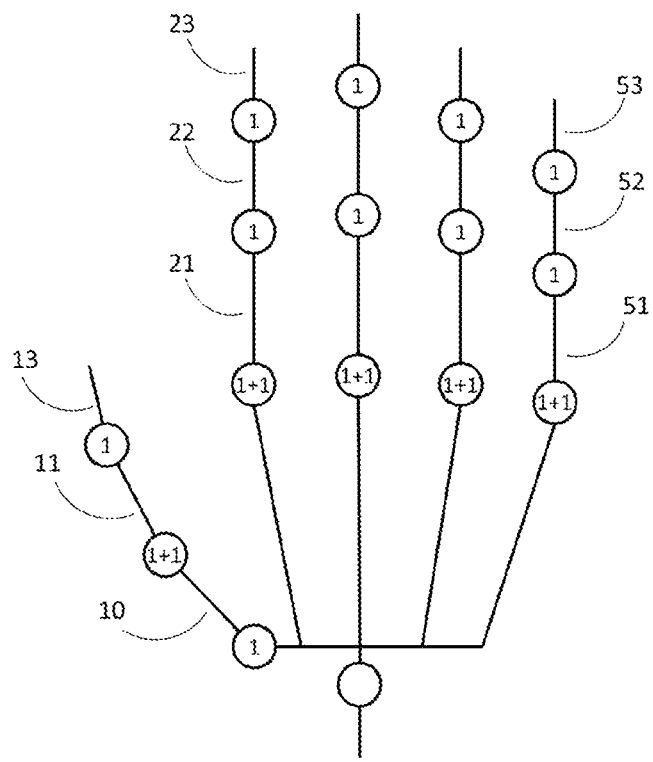
Fig. 4

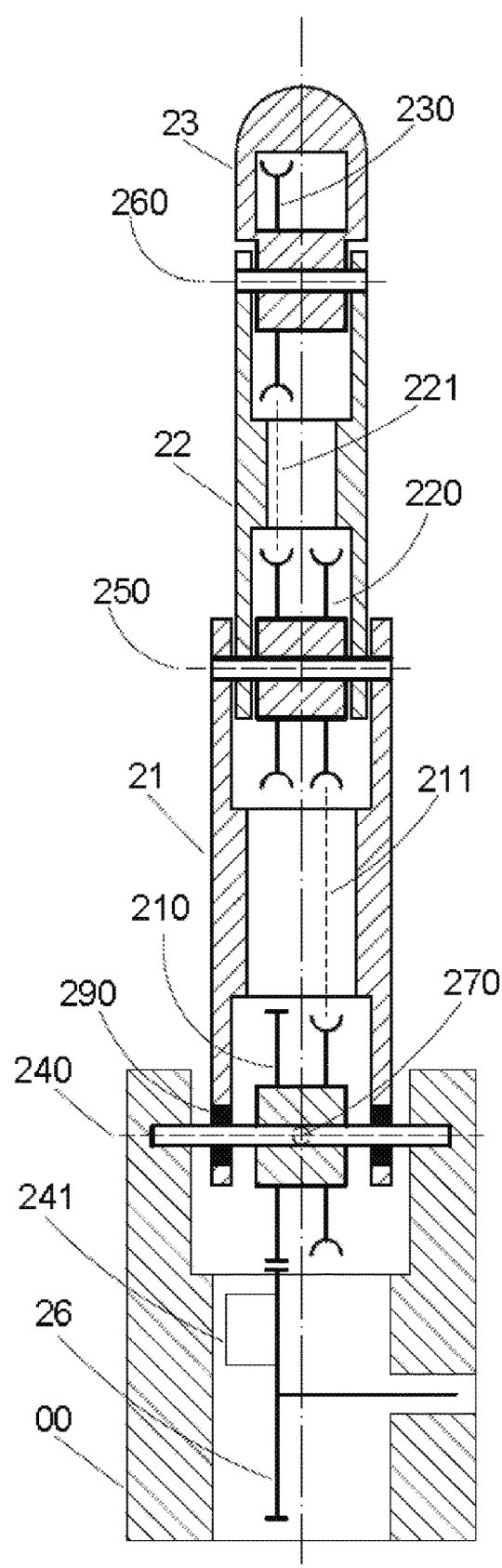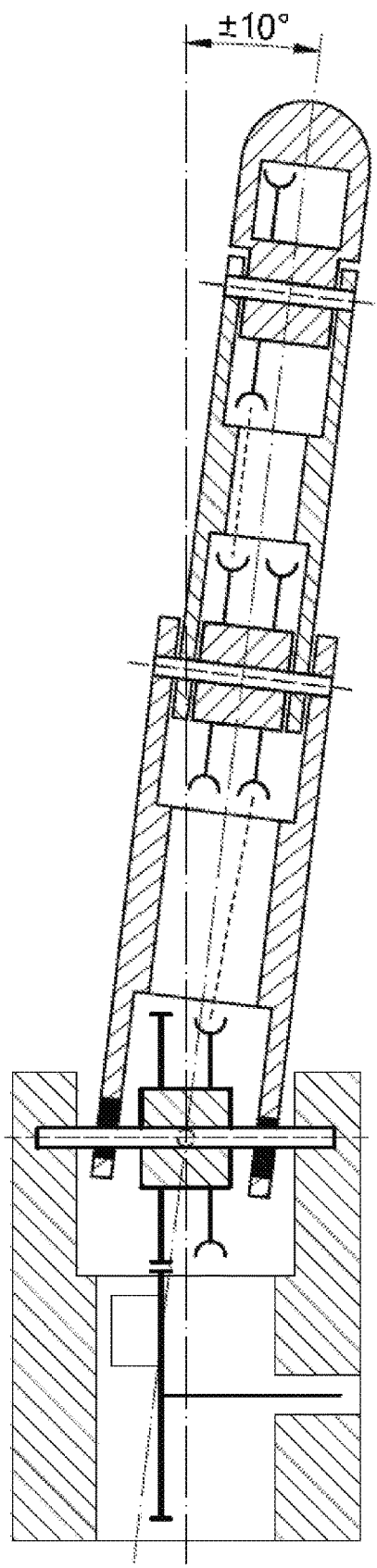
Fig. 3-a
Fig. 3-b

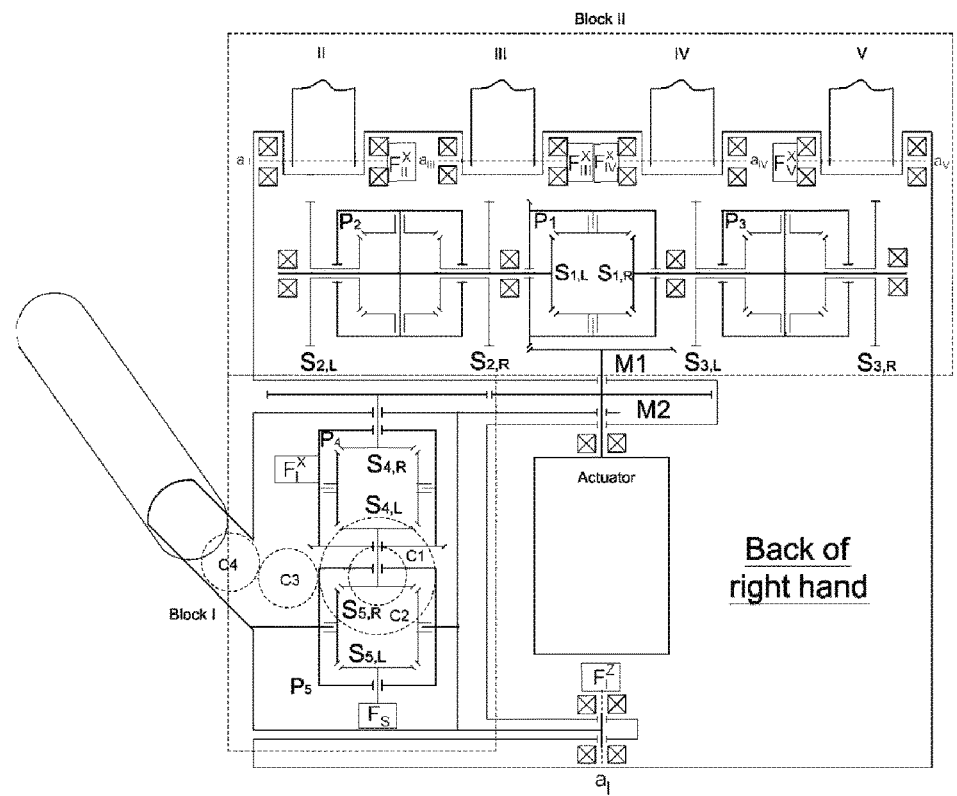
Fig. 9 - *PRIOR ART*
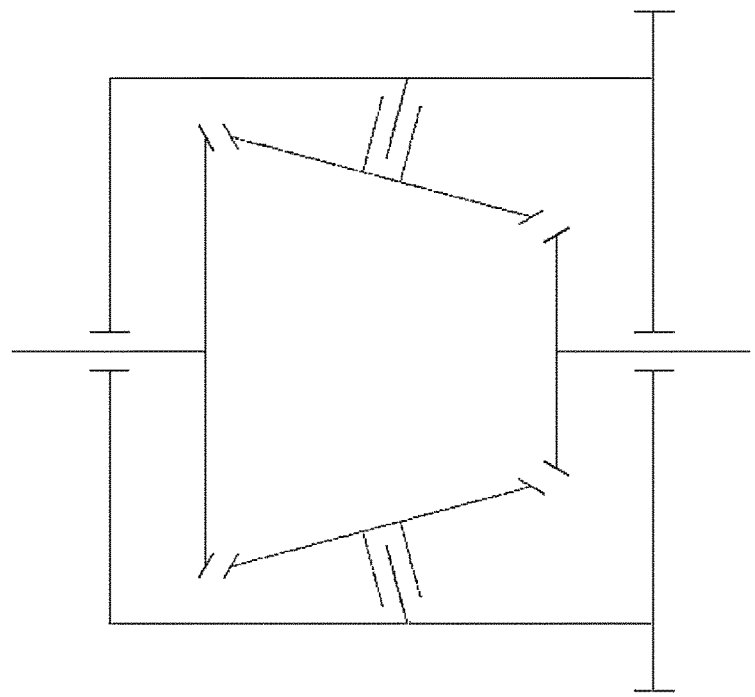
Fig. 10

UNDERACTUATED ROBOTIC HAND

BACKGROUND OF THE INVENTION

1. Field of the Invention

The present industrial invention relates to an underactuated robotic hand.

The definition "robotic hand" relates to an end-effector with an anthropomorphic inspiration. Due to the human hand complexity, the creation of a mechanism able to reproduce accurately its functions is very challenging.

The robotic hands proposed in literature can be divided in three main categories, according to the number of their degrees of freedom (DOFs) and of their degrees of actuation (DOAs): fully-actuated, underactuated and redundantly actuated.

Fully-actuated robotic hands have a number of degrees of freedom equal to the number of degrees of actuation. Underactuated robotic hands have a number of degrees of freedom higher than the number of degrees of actuation. Redundantly actuated robotic hands have a number of degrees of freedom lower than the number of degrees of actuation.

Fully-actuated robotic hands, while capable of efficient grasping, are extremely complex, and this leads to high costs and an overall lack of robustness. This is especially true for redundantly actuated robotic hands. This is the main reason why, recently, an increasing interest in underactuated designs can be found.

The basic idea of the underactuation in robotic grasping is to use a mechanical system which, by means of passive elements such as springs and mechanical limits, can automatically adapt to the specific shape of the grasped object, so that the number or required actuators is lower than the number of the manipulator DOFs. This results in simpler control systems and in a reduction of the manipulator costs. One of the manners to obtain an underactuated mechanism is to use differential systems, which automatically distribute one input to several outputs, the ratio between such outputs being defined by their kinematic state and by the design parameters of the mechanism itself. In particular, according to the terminology of the International Federation for the Theory of Mechanisms and Machines, a differential mechanism is a "mechanism for which the degree of freedom is two and which may accept two inputs to produce one output or, may resolve a single input into two outputs".

In order to obtain more than two outputs, multiple differential modules can be used, configured in series or in parallel according to needs, each one adding 1 DOF to the system. In general, (n−1) differential stages are required to obtain n outputs.

2. Brief Description of the Prior Art

In particular, according to the state of the art, there are known underactuated robotic hands which use one or more differential stages to transmit motion to the various fingers. An example is described in document KR100848179. Another example is described in JP2001277175, wherein it is described a robotic hand whose kinematic scheme, extracted by said document, is shown in FIG. 1. As far as can be understood from the description contained in the document, the shown mechanism allows to move the four fingers of a hand (from the forefinger to the little finger) by using three differential stages, by means of only one motor. However, such mechanism has many drawbacks, linked to the fact that it is not possible to move also the thumb with the same motor and to the fact that the construction of the system uses an excessive quantity of gears and pulleys, and so it is subjected to too much backlash and frictions. Moreover, in case of failure, fingers cannot be substituted easily and, even when they function, they only present two phalanges, not three as it occurs in the human hand. Another example known at the state of the art is the publication Zappatore et al. (2017) Adam's Hand: An Underactuated Robotic End-Effector, in Advances in Italian Mechanism Science. Mechanisms and Machine Science, vol. 47. Springer, Cham (in the following indicated also as D1), wherein it is described an underactuated anthropomorphic hand, in which all the five fingers and the metacarpus are moved by just one motor by means of a sequence of differential stages. However, in the mechanism described in this publication the driving shaft is directly connected both to the planet carrier of the differential stage which transmits motion to the four aligned fingers and to the sun gear of the differential stage which moves the metacarpus. This configuration of the mechanism leads to a series of problems, the most evident of which is that if the four parallel fingers are stopped, because they are grasping an object or they have reached their mechanical limits, this implies that the motor must stop and accordingly also the thumb has to stop, even if it is not grasping the object yet.

Another drawback of the mechanism described in the cited publication is that the couplings between the motor and the fourth stage and between the fourth and the fifth stage respectively occur by connecting the motor (M2) to the sun gear of the following stage (S4, R) and by connecting the previous sun gear (S4, L) to the sun gear of the following stage (S5, R), and not to the planet carrier of the following stage, in the two cases respectively P4 and P5. This implies, in some conditions, undesired combinations of movements which make it impossible the grasping action, as for example flexion of fingers 2, 3, 4 and 5 while extending thumb and vice versa, or contemporary flexion and abduction of thumb.

Another drawback of the mechanism in the cited publication is that inside the fingers it is used an idler gears train to transmit motion among phalanges. This prevents both implementing passive adduction/abduction degrees of freedom, since fingers have to remain substantially aligned between each other and to the palm, and modifying phalanx length easily, since for doing so the gears number and module should be modified. So basically, fingers should be re-designed for each different user, making the device expensive, or as an alternative only few standard "sizes" should be designed, as it occurs with other existing prostheses.

Another document known at the state of the art relating to the same problem is CN87103848, which describes a robotic hand whose kinematic scheme comprises a series of differential stages which distribute motion in input from a motor among the various elements of a robotic hand, in which also the various fingers are made up of differential stages. Clearly, realizing an anthropomorphic hand with fingers realized using bevel gear differential stages is problematic in terms of weight and dimensions, and above all, it does not allow to modify easily the fingers dimensions. Moreover, in the document there is no reference to measures useful to improve resemblance of the robotic hand to the human hand from a functional point of view, neither it is shown an embodiment from a constructive point of view.

SUMMARY OF THE INVENTION

Therefore, it remains unsolved the problem to provide an underactuated robotic hand which overcomes the drawbacks linked to the known state of the art, and which allows, in particular, the actuation of all the fingers, comprised the thumb, by means of only one motor, which is robust and compact and which allows a simple substitution of the fingers, for example in case of failure.

Another technical problem is to provide a highly under-actuated robotic hand, with a mechanism based on gears and toothed belts and without using unidirectional actuation means, such as tendons.

Moreover, the present invention provides an underactuated robotic hand controlled by only one motor in which the movement of the thumb can continue even if the other four fingers are all grasping an object. Yet another technical problem solved by the present invention is to provide an anthropomorphic hand with dimensions and weight comparable with the ones of a normal limb, by reducing the quantity of active components (motors) in order to reduce the weight of the device and to increase its usability.

Another problem solved by the hand according to the present invention is to provide an underactuated robotic hand whose mechanism allows to imitate the human hand functionality as accurately as possible, and which allows in particular to distribute the tightening torque differently among the various fingers, as it occurs in a human hand.

Finally, a technical problem solved by the present invention is to provide an underactuated robotic hand whose fingers phalanx dimensions, their aspect and the materials of which they are made can be modified without needing a re-design of the mechanism.

The object of the present invention reaches the prefixed aims since it is an anthropomorphic robotic hand comprising: a palm and a metacarpus configured to rotate with respect to said palm around an axis of rotation; four fingers substantially aligned and constrained to said palm and a finger opposable to them, each one of said fingers constrained to the palm comprising at least a proximal phalanx, a middle phalanx and a distal phalanx, and said opposable finger comprising a proximal phalanx and a distal phalanx, the proximal phalanges of each one of said aligned fingers being hinged to said palm in respective axes of rotation and the proximal phalanx of said opposable finger being hinged to said metacarpus in respective axes of rotation; a motor; a plurality of bevel gear differential stages which transmit motion from said motor to said aligned fingers and to said opposable finger, characterized in that said plurality of differential stages comprises a first differential stage whose planet carrier is moved by said motor and whose sun gears move the planet carriers of a second and a fifth differential stage, the sun gears of said second differential stage being integral to the planet carriers of a third and a fourth differential stage, the sun gears of said third and fourth differential stage being configured so that they respectively engage with four gears having axes coincident with said respective axes of rotation between the proximal phalanges of said aligned fingers and said palm.

It is to be précised that the definition "substantially aligned" is referred to the position of the four fingers from the forefinger to the little finger, constrained to the palm, which in a human hand, even if not necessarily parallel to each other, have still a rest position in which they are parallel and a limited angular excursion in the hand horizontal plane.

BRIEF DESCRIPTION OF THE DRAWINGS

FIG. 1 shows the kinematic scheme of the device described in JP2001277175;

FIGS. 3-a and 3-b show in detail the way in which the fingers adduction/abduction movement is preferably realized;

FIG. 4 shows a scheme with the collocation of the degrees of freedom provided for the various components of the anthropomorphic hand according to the invention;

FIG. 9 shows an embodiment known according to the state of the art, extracted by the cited publication.

FIG. 10 shows, schematically, a bevel gear differential stage with sun gears with different diameters.

DETAILED DESCRIPTION OF THE PREFERRED EMBODIMENTS

Figure 2:
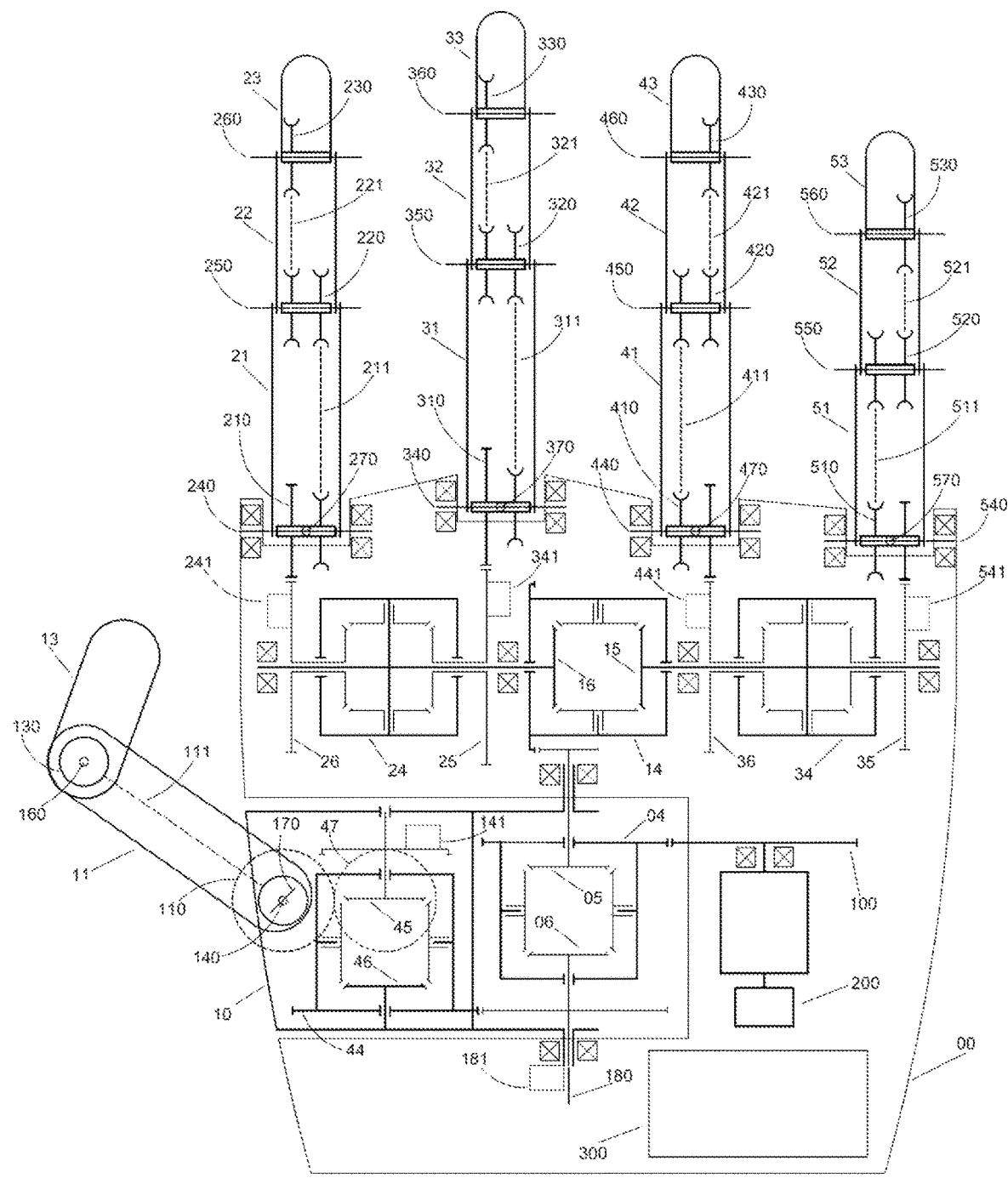
FIG. 2 shows a preferred embodiment of the kinematic scheme of the device according to the present invention.
Figure 5:
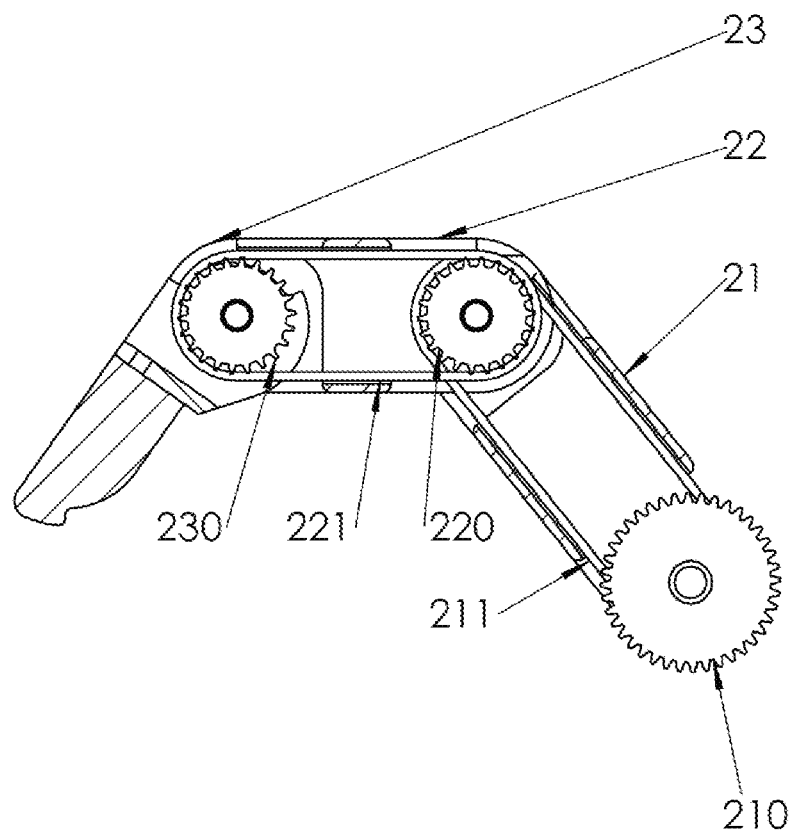
FIGS. 5, 6 and 7 show views of a possible construction method of the hand according to the invention.

In the embodiment described in the following, the mechanism has 20 degrees of freedom, of which 15 are controllable actively and bi-directionally by means of the only one motor provided (100) and 5 are passive and can be adapted in certain limits to the shape of the grasped object, but cannot be controlled actively.

Due to the complexity of the mechanism it is considered useful to introduce the criteria according to which nomenclature was assigned. The elements of the five bevel gear differential stages are indicated with a number between 0 and 4 (identifying of the stage) followed by the number 4 for the planet carrier, 5 for the right sun gear and 6 for the left sun gear. So, for example, the planet carrier of the third stage is indicated with the reference (24).

Phalanges are indicated with references made up of a number between 1 and 5 which identifies the finger, followed by the number 1 for the proximal phalanx, 2 for the middle phalanx, 3 for the distal phalanx and 0 for the metacarpus in the case of the thumb. Therefore, for example, the middle phalanx of the ring finger is indicated with the reference (42), the proximal phalanx of the thumb with the reference (11) and so on. Moreover, for each finger, the first pulley and the toothed belt connecting the following pulley are indicated with the reference of the finger followed by 10 and 11. Similarly, the second pulley and the toothed belt connecting the following pulley are indicated with the reference of the finger followed by 20 and 21, and followed by 30 for the third pulley.

For example, the second pulley of the middle finger is indicated with the reference (320).

Moreover, for each finger, reference 40 indicates the axis of rotation x (flexion/extension) and reference 41 the brake acting on such axis of rotation, while reference 60 indicates the axis of rotation z (abduction/adduction). Thus, according to the criterion, the axis x of the little finger is indicated with (540), the respective brake with (541). The axis of rotation of the metacarpus with respect to the palm is indicated with (80) and the brake acting on such axis of rotation is indicated with (81).

After specifying the assigning criteria of the numerical references, it is now possible to describe a preferred embodiment of the mechanism, whose kinematic scheme is shown in FIG. 2.

It is to be précised that it is shown a right hand, observed from the back of the hand. Obviously, the same mechanism can be realized for a left hand.

In the embodiment shown it is reproduced the functioning of an anthropomorphic robotic hand, provided with four aligned fingers, from the forefinger to the little finger, and with a finger opposable to them (thumb). The whole mechanism is moved by the only one motor (100), and the motion is distributed to the fingers by means of a plurality of differential stages.

The planet carrier (04) of the first differential stage is moved directly by the motor (100), and the first differential stage transmits motion by means of the right sun gear (05) to the differential stages which move the four aligned fingers, and by means of the left sun gear (06) to the differential stage which moves the thumb. For simplicity the definition right and left sun gear are used also for the first and the fifth stage, indicating as left sun gear the one in the bottom in the figure.

It is to be observed that, in the kinematic scheme according to the invention, the planet carrier (04) of the first differential stage is the only gear directly moved by the motor, unlike what occurs in mechanisms known at the state of the art, as for example the one shown in FIG. 9—extracted by D1—wherein the motor moves directly both the planet carrier P1 of the stage 1 and the sun gear S4R of the stage 4.

Starting the analysis from the movement of the four aligned fingers, from the kinematic scheme it is noted that the right sun gear (05) of the first differential stage engages with the planet carrier (14) of the second differential stage. The second differential stage distributes motion to the two following stages which respectively carry out the movement of forefinger and middle finger and the movement of ring finger and little finger.

Therefore, the movement is transmitted to the planet carrier (14) by the right sun gear (05) of the first differential stage, and it is then subdivided to the next differential stages, by means of the sun gears (15, 16). In order to optimize the mechanism reliability and dimensions, the left sun gear (16) of the second stage and the planet carrier (24) of the third stage are integral to each other. The same occurs for the right sun gear (15) of the second stage which is integral to the planet carrier (34) of the fourth stage.

It is to be précised that the fact that the sun gears (15, 16) of the second stage are integral to the planet carriers (24, 34) of the following stages (instead of connecting them through a toothed coupling, as for example occurs in JP2001277175) allows to reduce the mechanism dimensions and above all its backlash and frictions.

Figure 11:
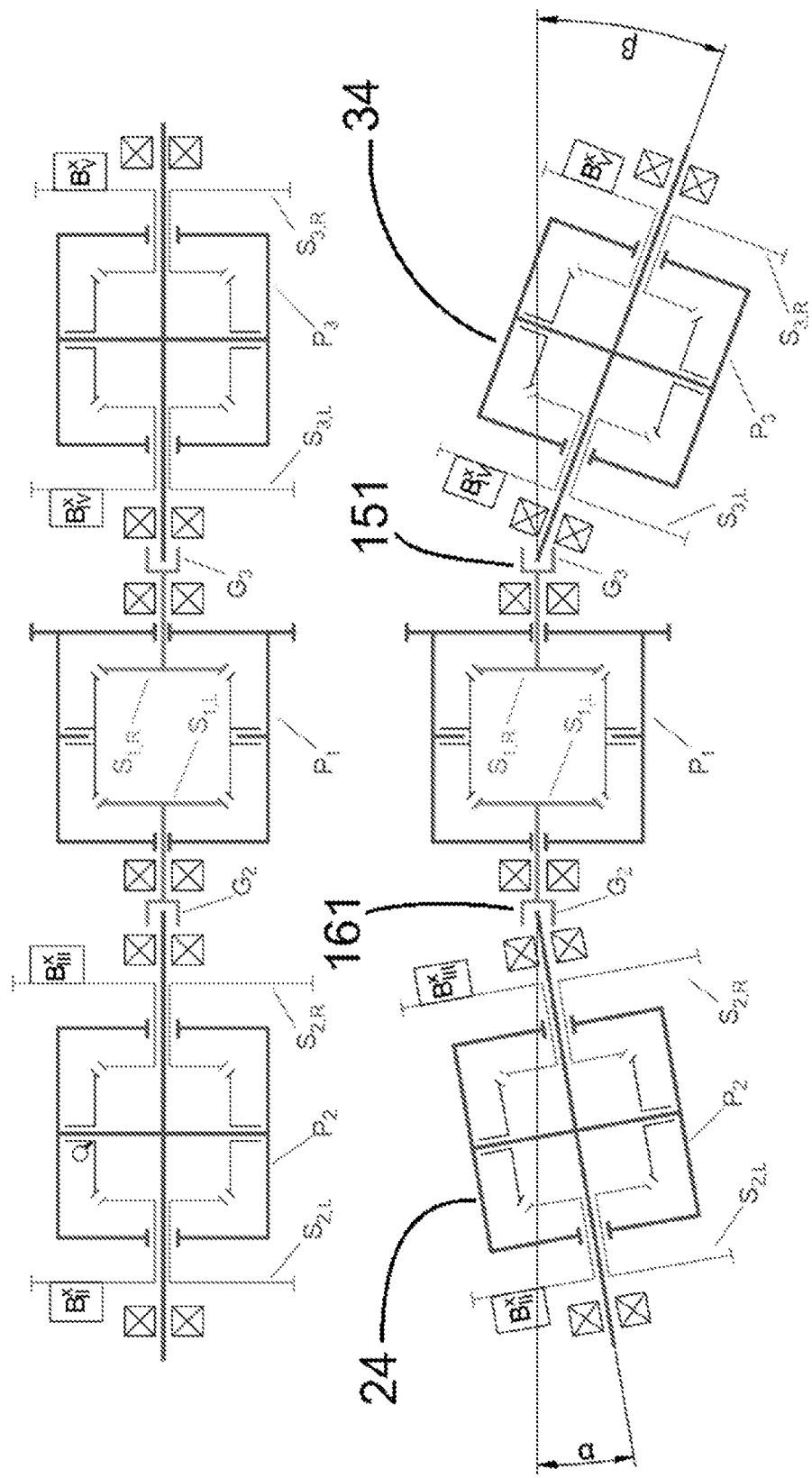
FIG. 11 shows two embodiments of the three differential stages which transmit motion to the aligned fingers, respectively with the axes of rotation of the sun gears aligned and with the axes of rotation of the sun gears mutually inclined. Two axonometric views of a possible embodiment with inclined axes are shown in FIGS. 12 and 13.

According to another embodiment, shown in FIG. 11, the axes of rotation of the planet carriers (24, 34) of third and fourth stage can be mounted inclined to the shafts of the sun gears (16, 15) of the second stage by interposition of a Cardan joint (161, 151) on respective connecting shafts, which allows the transmission of rotation between mutually inclined shafts. It is not needed that mutual inclination angles ($\alpha$, $\beta$) are identical. This way, during the flexion movement the finger 2 (forefinger) and 3 (middle) converge towards the finger 4 (ring finger) and 5 (little finger), improving the resemblance to the human hand (improved anthropomorphism) and making it possible the grasping of thin objects between the two fingers 3 and 4, which is a useful grip in many activities of daily life.

It is to be considered that, even if in FIG. 11 it is shown a view on the horizontal plane of the hand, the interposition of the Cardan joints (151, 16) can allow:

a relative inclination $\gamma$ between the second and the third stage also in a plane normal to the horizontal plane of the hand, passing through the center of the Cardan joint (161) and inclined of an angle $\alpha$ to the front plane of the hand.

a relative inclination $\delta$ between the second and the fourth stage can occur also in a plane normal to the horizontal plane of the hand, passing through the center of the Cardan joint (151) and inclined of an angle $\beta$ to the frontal plane of the hand.

Figure 12:
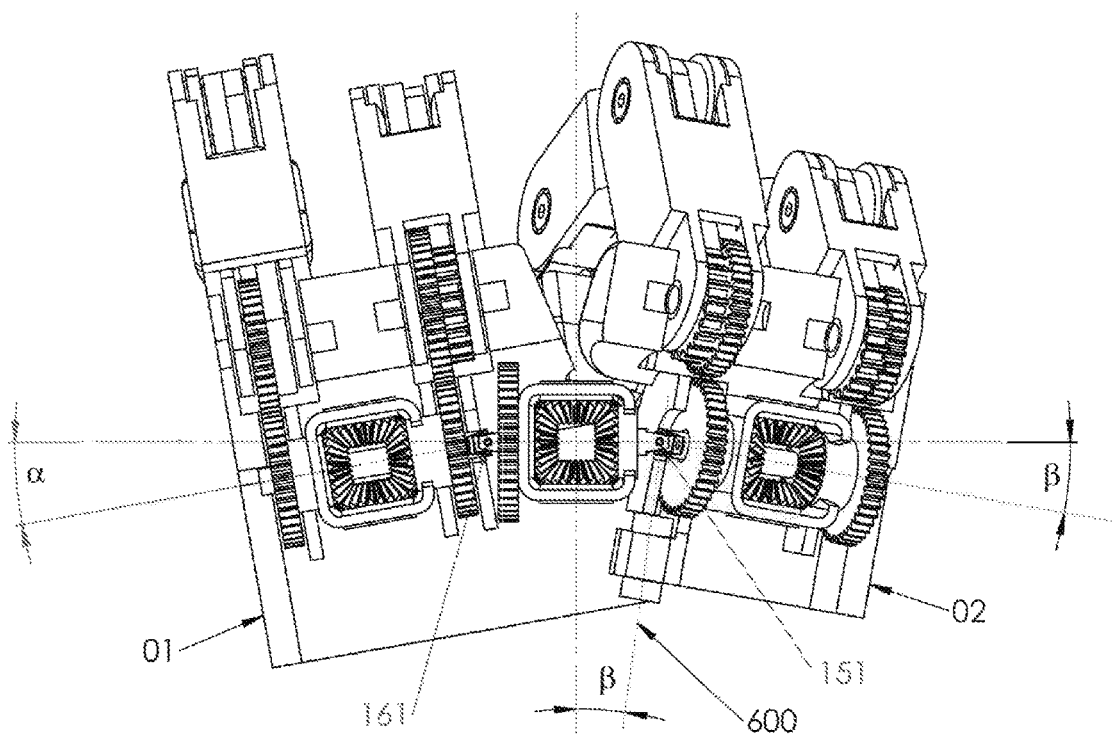
Figure 13:
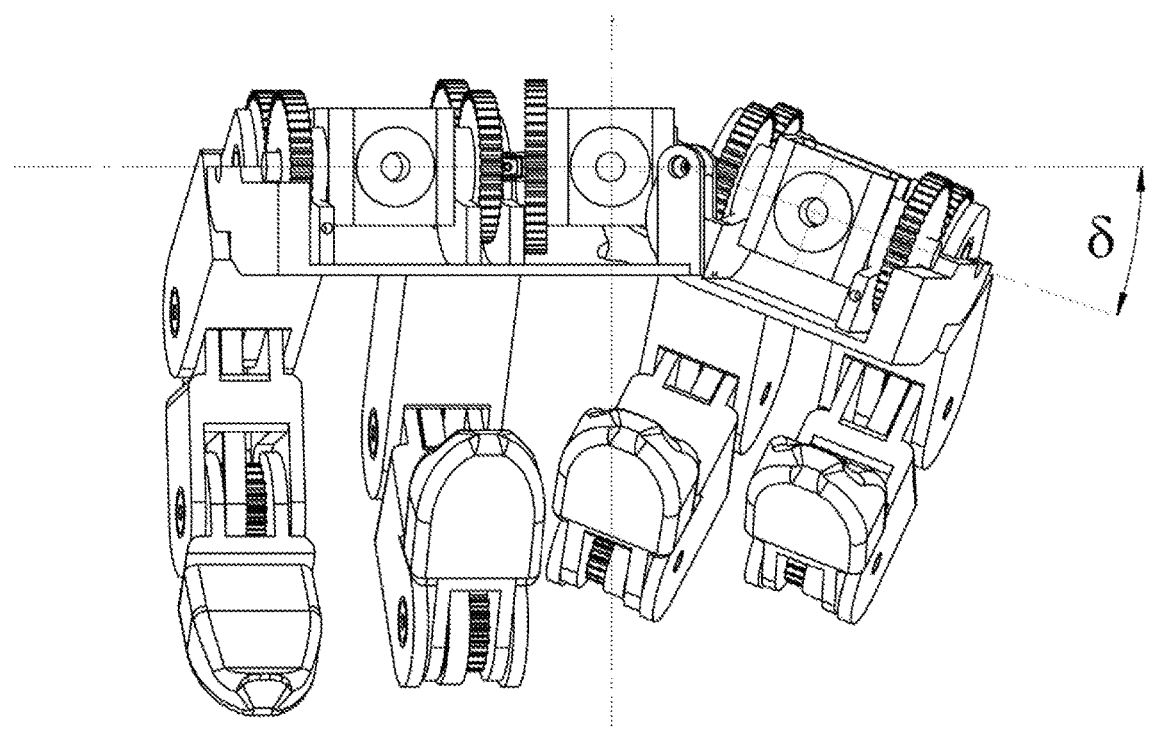

If, for example, as it is shown in FIG. 12, the structure of the palm is realized in two portions (01) and (02) hinged by means of a Cardan joint (151) along an axis (600) belonging to the horizontal plane of the hand, passing through the center of the Cardan joint (151) and inclined of an angle □ to the middle plane of the hand, during the grasping action the ring finger and the little finger (4, 5), in addition to flex, will converge towards the middle plane of the hand together with the right portion of the palm, rotating around the axis of rotation (600), opposing to the thumb and thus improving some kinds of grasps and the prosthesis anthropomorphism.

The degree of freedom added in this way (the hinge between right and left portion of the palm) can be managed both actively by means of a second actuator and passively by using springs.

Figure 7:
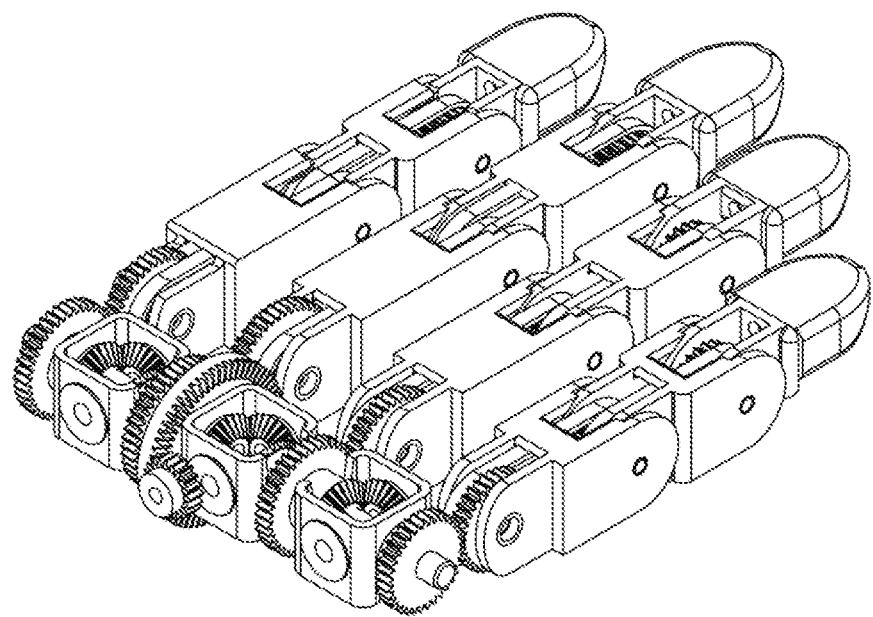
Figure 6:
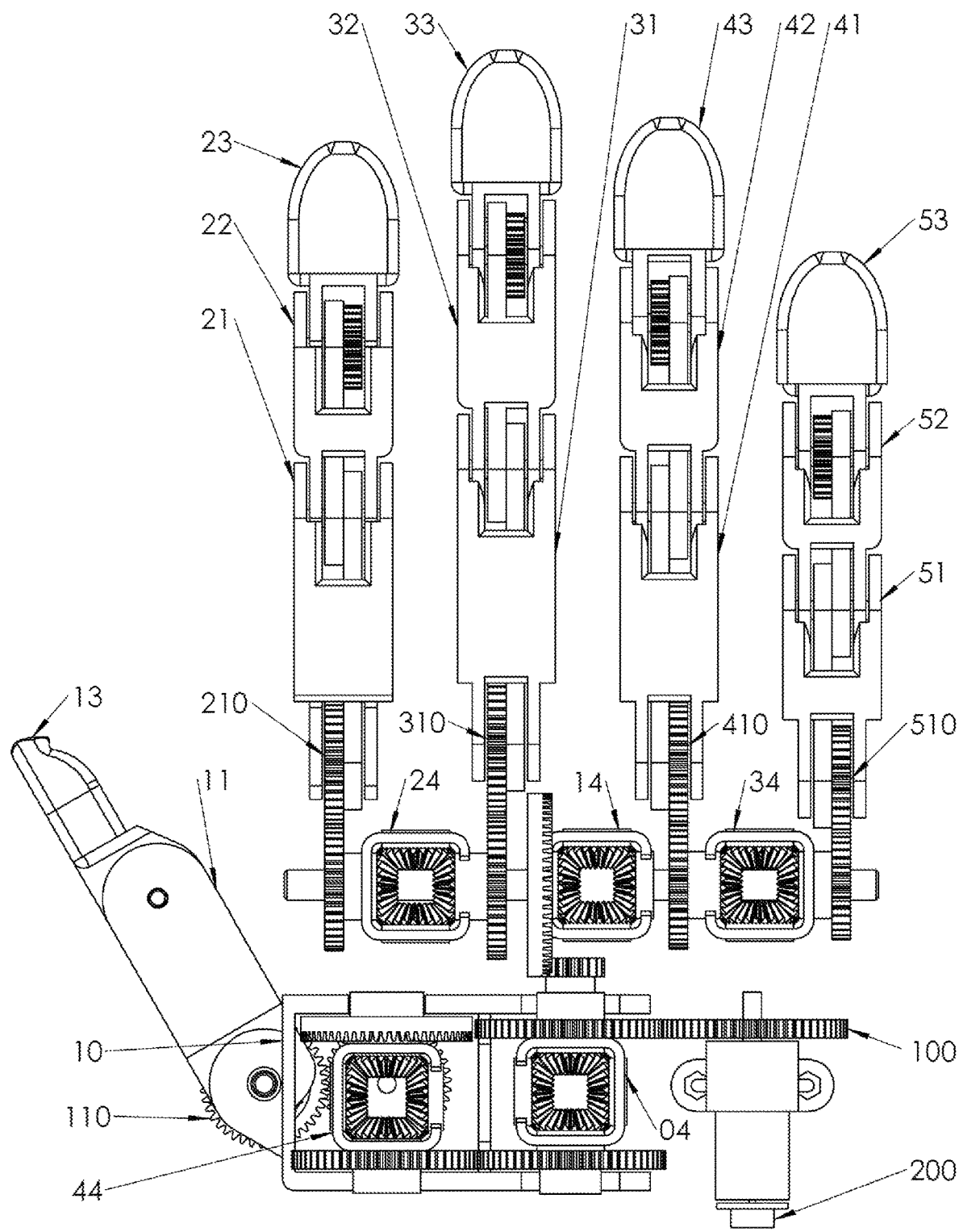
Figure 8:
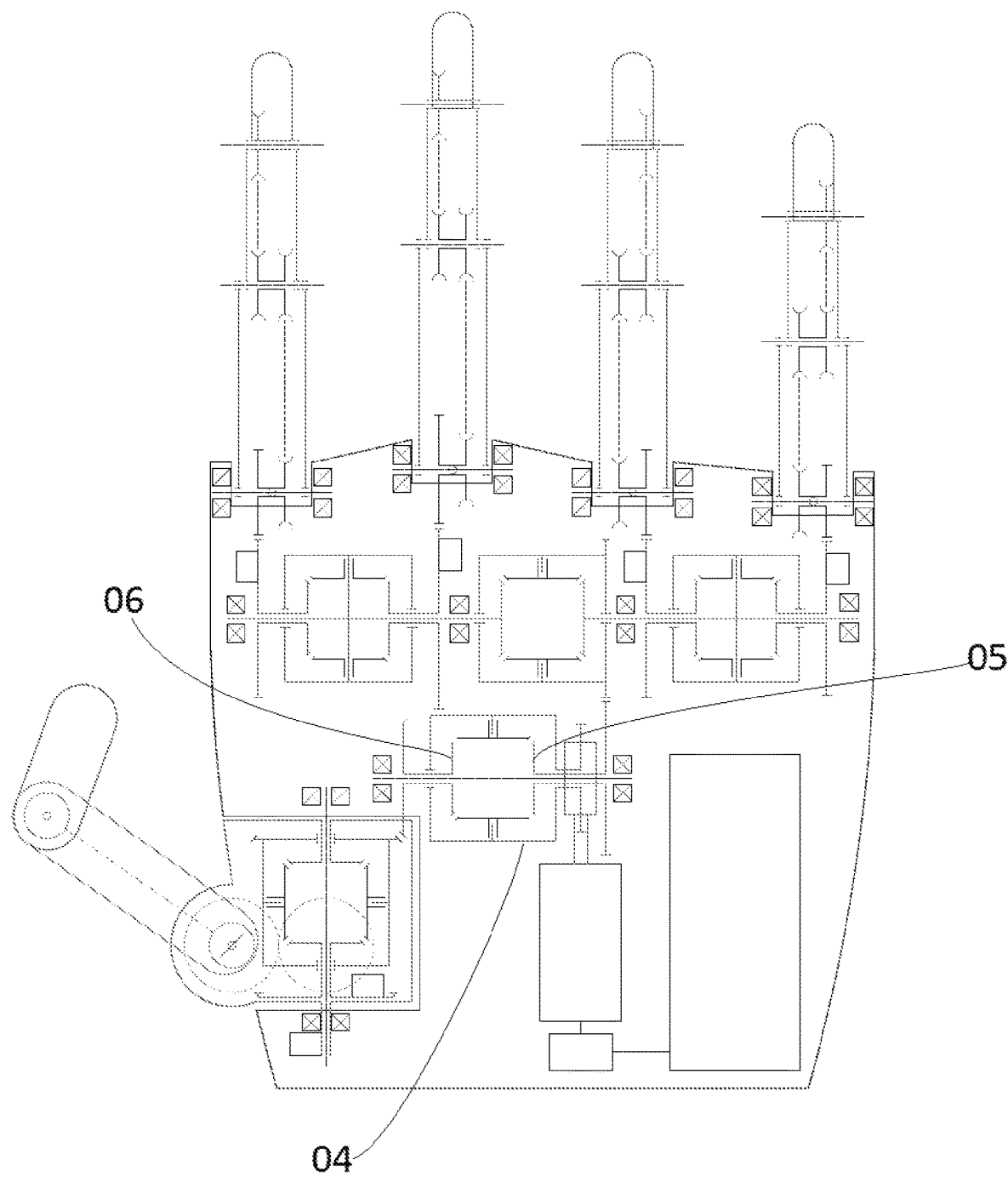
FIG. 8 shows the kinematic scheme of a second preferred embodiment of the device according to the invention.

From a constructive point of view, as it is shown in FIGS. 7 and 8, the differential stages described so far, are preferably bevel gear differential stages. As already said, motion is transmitted to the aligned fingers by the third and fourth differential stage.

Before describing the transmission of motion, it is useful to describe the preferred embodiment of the single fingers, at first with reference to the four aligned fingers.

Each finger is made up of three phalanges, coupled-hinged to each other around a relative axis of rotation. The proximal phalanx of finger 1 is hinged to the metacarpus (10) around a relative axis of rotation, while the proximal phalanges of fingers from forefinger to ring finger and the metacarpus (10) are hinged to the palm of the hand, around a relative axis of rotation. The shape of the components (phalanges, metacarpus and palm) is such that the rotation allowed around all the respective axes of rotation is limited to values similar to the physiological ones of the respective components of the human hand. Without this limiting the aims of the invention, according to a preferred embodiment the aligned fingers (from the forefinger to the little finger), with respect to the basic configuration with completely extended fingers, have the possibility to flex the proximal phalanx between about 90° and 110°, the middle phalanx between 90° and 135° and the distal phalanx between 85 and 90°. Concerning the thumb instead, always as a rough guide, the proximal phalanx flexion can reach about 70°, the distal phalanx flexion about 75°, while the metacarpus can have an adduction of about 90°.

It is to be specified that the indicated movements and angles are those actively controllable, as it is explained in detail in the following. Preferably and not in a limiting manner, in order to further improve the resemblance to the human hand, the device according to the present invention can be realized with at least a portion of the mechanical limits not rigid, with particular reference to the limits concerning the fingers hyper-extension. For these mechanical limits an elastic material can be used, with a rigidity high enough to block the fingers extension beyond the basic position when these are actuated simply by the motor, and at the same time characterized by a sufficient compliance when the fingers are stressed passively. To explain what above-described with an example reference may be made to the hyper-extension movement of the fingers of the human hand, which we cannot control actively, but that occurs for example when we lean fingers on a table and bend the palm inwards. Therefore, the mechanical limits at the knuckles have a rigidity not high enough to be deformed when the motor exerts the maximum couple, but they are deformable when the prosthesis fingers are leant on a table and the palm is bent inwards.

While explaining the actively controlled movements of the fingers, for the sake of simplicity reference will be now made to the forefinger, beginning with the premise that, except for the obvious dimensional differences, the other fingers are realized in the same way. The forefinger is hinged to the palm of the hand at the axis of rotation (240) between proximal phalanx (21) and palm (00). The first toothed pulley (210) is positioned at such axis, engages with the left sun gear (26) of the third differential stage and is idler with respect to its axis of rotation. It is to be considered that, from a constructive point of view, the first toothed pulleys of each finger (140, 240, 340, 440 and 540) are conveniently made up of a gear integral to a toothed pulley. The gear engages with the respective sun gear of the bevel gear differential stages, while the tooted pulley is connected to the following pulley by means of a toothed belt.

The first pulley (210) is connected by means of the toothed belt (211) to the second toothed pulley (220), which is idler to the relative axis of rotation (250) between the proximal phalanx (21) and the middle phalanx (22) of the forefinger. This last pulley (220) is also connected by means of a second toothed belt (221) to the third toothed pulley (230), which has the axis coincident with the relative axis of rotation between the middle phalanx (22) and the distal phalanx (23), and it is integral to this last one.

Since the first two pulleys (210, 220) are idler to their relative axes, the motion of the left sun gear (26) of the second differential stage, frictions being omitted for simplicity, is directly transmitted to the pulley (230) integral to the distal phalanx (23) of the forefinger, while the proximal (21) and middle phalanges (22) do not move. Once the distal phalanx (23) comes in contact with the object to be grasped or reaches its mechanical limit, its movement is blocked and the third pulley (230), which is integral to the distal phalanx, cannot rotate anymore. Due to the connection by means of the toothed belt (221), even the second pulley (220) cannot rotate with respect to the middle phalanx (22), so this last one begins to rotate with respect to the proximal phalanx. When also the middle phalanx (22) engages with the grasped object or reaches its mechanical limit, also the first pulley (210) stops due to the connection through the toothed belt (211) with the second pulley (220). Therefore, it becomes integral to the proximal phalanx (21) which is forced to rotate with respect to the palm.

When also this last one is blocked by the grasped object (or it reaches its mechanical limit), the left sun gear (26) of the second differential stage stops, so all the driving torque of the planet carrier (24) is discharged on the right sun gear (25), which transmits movement to the middle finger in an absolutely similar way.

If also the middle finger stops (because it comes in contact with the grasped object or because all the rotations have reached their mechanical limits) even the relative sun gear (25) of the third differential stage cannot rotate, and so, also the relative planet carrier (24) stops. The ring finger and the little finger function similarly, and they are moved by the fourth differential stage, respectively by means of the left (36) and right (35) sun gear.

When the fingers from the forefinger to the little finger are in contact with the object (or reach their mechanical limits) also the planet carrier (14) of the second differential stage which transmits them the motion is forced to stop, thus stopping also the right sun gear (05) of the first differential stage with which it engages. In this case the planet carrier (04) of the first stage discharges all the driving torque transmitted by the motor (100) on the left sun gear (06) which controls the movement of the thumb.

The left sun gear (06) of the first differential stage engages with the planet carrier (44) of the fifth differential stage, which distributes the torque between the adduction/abduction movements (controlled by the left sun gear 46) and flexion/extension (controlled by the right sun gear 45) of the thumb.

The left sun gear (46) is integral to the metacarpus (10), so when it is actuated the whole metacarpus (10) rotates around the axis (180), carrying out the adduction/abduction movement. Such axis (180) should not necessarily coincide with the axis of rotation of the stage 0, as it is shown in FIG. 2, but it can have a relative inclination with respect to this one with the aim of making the manipulator more similar to a human hand. In this case, clearly, the sun gear 06 and the planet carrier 44 will be conical gears, apt to be engaged with said relative inclination.

The right sun gear (45) engages with the gear (47), which in turn transmits the motion to the pulley 110, thus allowing the thumb flexion/extension.

When also the metacarpus (10) and the phalanges (11, 13) of the thumb come in contact with the grasped object (or reach their mechanical limits), the motor (100) is forced to stop. By current-controlling the motor the maximum torque exerted is determined and, in this way, also the maximum torque transmitted to the fingers, which determines the grasping force. In addition, it is possible to carry out a control on the motor speed with encoder (200) to control the speed with which the grip is performed.

Therefore, some advantages of the just described mechanism are clear: by controlling only one motor, the prosthesis user needs only one movement to open the hand and one to close it, regardless of the shape of the object to be grasped.

In addition, the grasping force control can be carried out by current-controlling the motor, and this can be easily done in a plurality of ways. For example, current can be controlled as a function of the number of signals read by control electrodes in a predetermined period of time (for example: 1 signal in 1 second for a weak grip, 2 signals in 1 second for a medium-strength grip, 3 signals in 1 second for a strong grip).

As an alternative, the current absorbed by the motor (and thus its exerted torque, which determines the grasping force) can be controlled as a function of the intensity of the signals detected by the electrodes, by correlating it in a directly proportional way or according to other calibration principle to be defined.

The mechanism compactness allows to position also the control board (300) inside the manipulator, so that it acquires a higher degree of modularity. This is particularly useful when it is used by people with different amputation levels: for example, a "wrist" module and a "forearm" module can be added to the manipulator module in case of a transradial amputation, while in case of amputation under the wrist the manipulator module can be used alone To sum up, the motor torque is firstly divided (from the first differential stage) between the thumb and the other four fingers. This makes it possible that, at steady-state, the torque exerted by the thumb is equal to the sum of the torques exerted by the other fingers, which is an optimal condition to carry out the grip which require thumb opposing to the other fingers. The torque transmitted to the thumb is subdivided (from the fifth differential stage) between the adduction/abduction and flexion/extension movements, while the torque transmitted to the other four fingers is firstly subdivided (from the second differential stage) between forefinger and middle finger on one side and between ring finger and little finger on the other side, and finally (from the third and fourth differential stage) distributed to the single fingers. The automatic distribution of the torque according to the just described kinematic scheme makes it possible that, even by using just a single command (1 degree of actuation) the fingers automatically adapt to the shape of the grasped object, always developing the most stable grasp.

It is also clear, from the just discussed description of the mechanism, that the functioning is absolutely similar for both the hand closing and opening movements. In fact, all the utilized connections are bi-directional (gears and toothed belts) and unidirectional elements (tendons, tension rods . . . ) are not used, also having the limit that they cannot exert great forces and that they have higher internal frictions compared to geared elements.

Another advantage of using bevel gear differential stages is the independence of the forces exerted by the sun gears with respect to their kinematic position. The bevel gear differential stages are globally force-isotropic, so independently of the kinematic position of the finger they exert a constant force, thus ensuring constant performances over the whole workspace. Such advantage is extended inside the fingers by using toothed belt drive, characterized by the transmitted forces independence from the pulleys wheelbase and from the phalanges relative inclination.

The same does not occur with other kinds of transmissions, such those ones based on cables, in which the forces exerted show a varying pattern depending on the phalanges relative inclination.

After understanding the concept of motion distribution explained in the previous kinematic scheme, some constructive measures useful to optimize the mechanism functioning are described below.

Preferably, at all the phalanges axes of rotation and at the metacarpus axis of rotation there are provided springs which exert an elastic torque between the various hinged elements, preferably in the direction of the hand closing.

The presence of springs, even if not indispensable, allows to obtain a series of advantages. Firstly, the springs allow to define the relative initial position between different fingers and between different phalanges of the same finger. This is particularly useful while assembling the device: it would be complex to set the starting position of the motor, corresponding to the hand completely closed by keeping all the joints in the correct position without the contribution of the springs which do it automatically.

Obviously in case of springs mounted in the direction of the hand opening, it will be possible to assemble the device in the starting position of completely open hand.

In addition, due to the backlash inevitably present in the gears train, if springs were absent, the motor, before moving the fingers, would rotate idly only to restore said backlash.

In presence of springs, instead, the gears are always brought by the springs in a position which implies null backlash.

In addition, the ratio between the rigidities of the springs used in the various axes of rotation inside each single finger determines the closing order of the phalanges. In particular, in order to carry out the correct grip of the object to be grasped, it is important that the first phalanx to rotate is the proximal one, then the middle one and only in the end the distal one.

As already said, the proximal phalanges are hinged around a relative axis of rotation with respect to the palm. Obviously, from a constructive point of view, at such axis a shaft is present.

Preferably, the proximal phalanges are not directly in contact to such shaft, but a cylinder coaxial to the shaft (240) is interposed between the phalanx and the shaft, shown in FIG. 3 with reference to the forefinger as an example, realized in elastic material, which allows a certain degree of adduction/abduction of the fingers.

It is important to note that this elastic cylinder (290) does not extend either in the palm (or in the metacarpus in the case of the thumb) nor in the central area of the shaft, so the palm (or the metacarpus in the case of the thumb) and the idler gear relative to the proximal phalanx are in direct contact with the shaft. When the fingers adduction happens, as shown in FIG. 3b, the proximal phalanx (21) (together with all the other phalanges and the respective pulleys) rotates, while both the gear (21) relative to the proximal phalanx and the palm (00) will remain still. Therefore, the gear (210) of the proximal phalanx and the relative sun gear (26) will engage without problems, since their axes will be always parallel and at a fixed distance, so they will always engage as by project.

But an inclination occurs between the gear (210) relative to the proximal phalanx and the gear (220) relative to the middle phalanx. However, these are connected by means of a toothed belt, thus by considering maximum inclinations of about 10°, their engagement will not be compromised.

While applying this measure, the expert in the field will obviously use all those design precautions which allow to exclude the interference between the various components, such as for example a certain clearance prevision in axial direction with respect to the axis (240) between the gear (210) and the phalanx (21).

Moreover, it is to be underlined that the elastic mechanical limits, the elastic cylinders which guarantee the presence of passive degrees of freedom, the springs provided inside the fingers and previously described as well as the eventual springs which guarantee the additional degree of freedom of relative rotation between the left portion (01) and the right portion (02) of the palm, are aimed at deadening undesired impacts of the device, thus increasing its compliance and creating a "buffer zone" between fingers and palm which guarantees a longer life for the used components.

According to another preferred embodiment, the under-actuated anthropomorphic hand, object of the present invention, can be realized so that every finger can be controlled individually. In fact, as explained, the motion of the motor (100) is transmitted to all the fingers, until the same are blocked by an object to be grasped or by their mechanical limits, and it is not possible to control each finger individually.

However, since as explained to stop each finger (both during extension and flexion) it is sufficient that it comes in contact with an obstacle which prevents the rotation of the proximal phalanx with respect to the palm (or with respect to the metacarpus in the case of the thumb), by introducing a brake (141, 241, 341, 441, 541,) at each of said axes it will be possible to simulate the presence of an obstacle or a mechanical limit, and to block flexion/extension of that finger.

In particular, at each finger, the brake has to block the first idler pulley, or equivalently, the sun gear which transmits the motion to the finger. Since the thumb has three active degrees of freedom with respect to the hand palm (two of flexion/extension and one of adduction/abduction, in addition to another passive degree of freedom of adduction/abduction) for the thumb a second brake (181) is needed to block also the abduction/adduction of the thumb (of the metacarpus with respect to the palm).

As an example, if starting from the configuration of open hand the fourth and the fifth finger (ring finger and little finger) have to be closed, it is sufficient to actuate the brakes (141, 181, 241, 341) relative to the other fingers and to actuate the motor (100) in the direction of rotation which applies a closing movement to the hand, so that the desired configuration is obtained.

Figure 14:
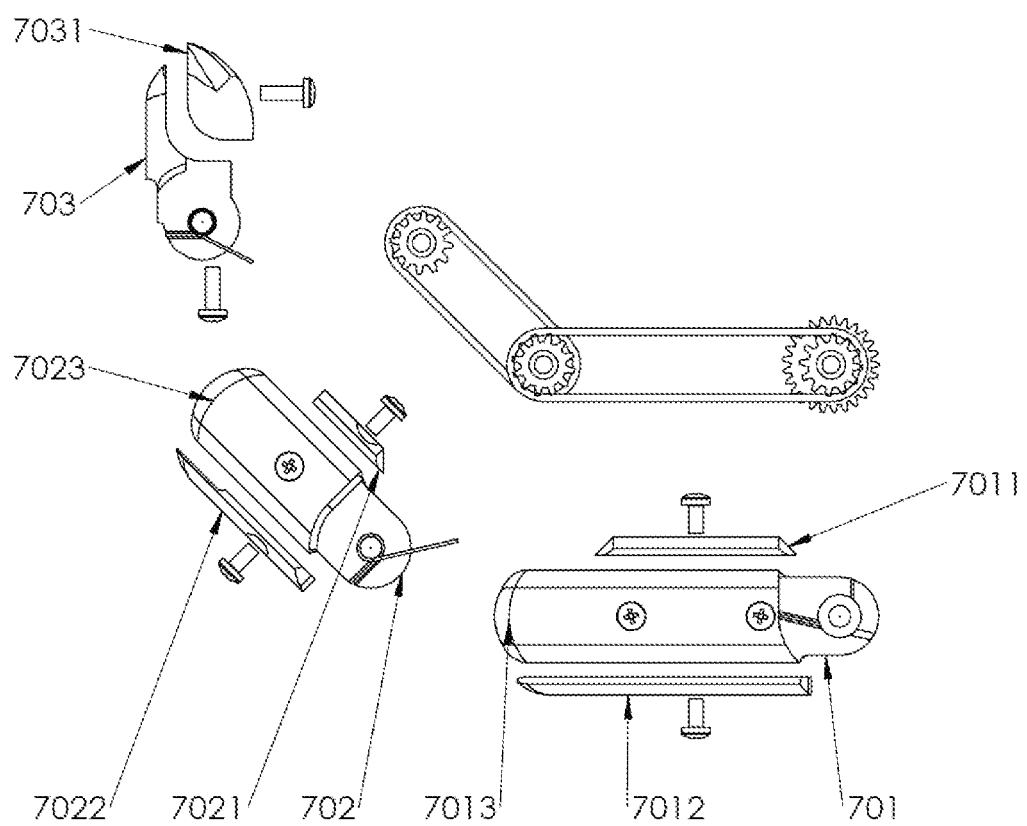
FIGS. 14 and 15 show a preferred embodiment of the fingers usable with the device according to the invention.
Figure 15:
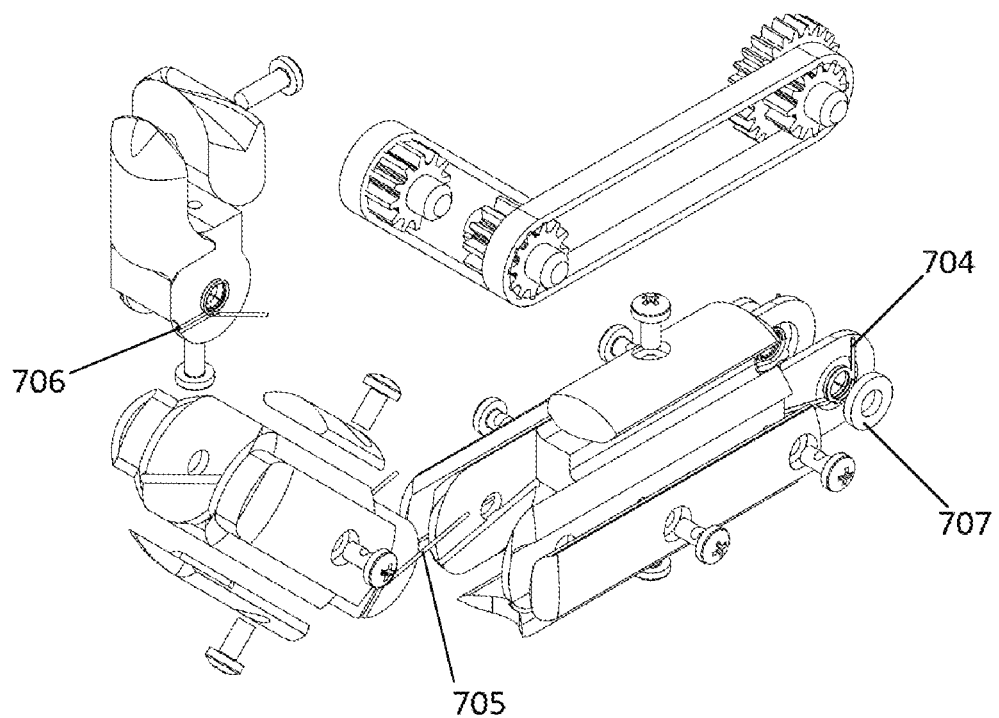

According to another embodiment variant the fingers can be realized as shown in FIGS. 14 and 15, wherein exploded views of an embodiment of one of the fingers of the device according to the invention are shown.

As shown in FIG. 14, and being understood the already described mechanism, the finger can be realized by using three components (701, 702, 703) hinged to each other in axes corresponding to the relative axis of rotation of the phalanges. These components, preferably realized in aluminum, steel, titanium or in plastic material provided with suitable structural strength, can be encased by applying surfaces of several softer materials (7011, 7012, 7013, 7014, 7021, 7022, 7023, 7024, 7031), such as for example silicone or rubber, so that the resemblance of the hand according to the invention to a human hand in terms of functionalities is improved, as for example a higher friction between fingers and the grasped objects and a better adaptation to their shape and dimensions.

In FIGS. 14 and 15 it is shown the constraint of such surfaces to the structure of the phalanges by means of couplings with screws and threaded holes, but other kinds of couplings are possible, such as for example couplings by means of suitable restraints or adhesives. Such elements constitute also the mechanical limits of relative rotation between phalanges, so in order to modify minimum and maximum angles of relative rotation it is sufficient to modify the shape of such surfaces without re-designing or disassembling, once assembled, the elements (701, 702, 703).

In FIGS. 14 and 15, it is also shown the position of the springs (704, 705, 706) and of the elastic cylinders used to obtain the passive adduction/abduction of the fingers (707), whose functioning has been already described.

The clamping screws of the encasing elements present a seat where the springs are fitted, so by screwing or unscrewing such screws it is possible to carry out a precise pre-loading of the springs. The encasing elements can be also used to contain sensors useful for the prosthesis functioning or to provide a feedback to the user.

According to another embodiment variant, the device can be realized by using sun gears with different diameter inside the same differential stage. The use of sun gears with different diameter in a bevel gear differential stage is shown schematically in FIG. 10.

From a constructive point of view, having sun gears with different diameters means the need to incline the axes of the spider gears, but allows to distribute the torque differently between the sun gears and thus between the fingers by them actuated, thus increasing the degree of resemblance to the human hand. Preferably, the different diameters of the sun gears can be configured so that the torque transmitted to the four aligned fingers is approximately subdivided according to what indicated in the following: 25% for fingers 2 and 4, 35% for finger 3, 15% for finger 5.

Another variant of the mechanism is shown in FIG. 8, wherein the underactuated hand according to the invention is realized with the axis of rotation of the sun gears (05, 06) of the stage zero orthogonal to the direction of the four aligned fingers when in extended position. This direction of the axis of rotation of the sun gears (05, 06) of the stage zero implies some constructive advantages: firstly, it allows to obtain coupling between the sun gear (05) of the stage zero and the planet carrier (14) of the stage 1 by means of spur gears, rather than of conical gears or face gears, with all the technical simplifications deriving therefrom (smaller dimensions, higher precision and components constructive and realization simplicity). Moreover, this arrangement of the differential stage zero allows to carry out the coupling between motor and differential 0 by using a worm gear reducer, difficult to obtain in other configurations due to dimensional restrictions. In addition to being an extremely compact way for carrying out the motor speed reduction/torque increase, this is also a non-backdrivable mechanism: by acting on the fingers these cannot be re-opened because it is impossible to transmit motion from the planet carrier of the stage zero to the motor, and thus once the complete closing of the fingers is reached, it is possible to turn off the motor (thus saving battery autonomy) since the grip remains stable because the fingers cannot be re-opened passively, unless safety devices are used in case of danger. A further advantage obtainable is that the axis of rotation of the metacarpus (180) coincides with the axis of rotation of the sun gears (45, 46) of the differential stage 4, with clear kinematic, dynamic and dimensional advantages.

It is clear that the kinematic scheme shown is an example and does not limit the aims of the invention. Is it to be specified that, as a way of example, the dimension of the limb can be modified by changing, according to need, the gears module, the number of teeth of the pulleys or the length of the toothed belts, while the speed ratio between the thumb and the other fingers (in the absence of external loads, since under load the configuration assumed by the hand is determined by the forces exchanged with the grasped object) can be varied by changing the transmission ratio between the first and the second bevel gear differential stage (gears 05 and 14) or between the first and the fifth ones (gears 06 and 44). The speed ratio between adduction and flexion of the thumb can be instead modified by changing the transmission ratio between the gear 45 and the gear perpendicular thereto (47).

In FIG. 4 it is shown a scheme of the hand degrees of freedom. The knots with the indication "1" refer to an actively controllable degree of freedom. The knots which report the indication "1+1" refer to the knots in which a degree of freedom is actively controllable (extension/flexion) while the other is passive, and can only adapt to the shape of the grasped object (adduction/abduction).

According to another embodiment (not shown in figure) the number of degrees of freedom of the underactuated anthropomorphic hand according to the invention can be increased, by adding another little phalanx to the thumb. Thus, for what concerns the flexion/extension movement, the thumb would be than realized and actuated absolutely identically to what described for the other fingers.

The invention claimed is:

1. An anthropomorphic robotic hand, comprising:
a palm (00) and a metacarpus (10) configured to rotate with respect to said palm around an axis of rotation (180);
four fingers substantially aligned and constrained to said palm and a fifth finger opposing to the four aligned fingers, each one of said four aligned fingers comprising at least a proximal phalanx (21, 31, 41, 51), a middle phalanx (22, 32, 42, 52) and a distal phalanx (23, 33, 43, 53), and said fifth finger comprising a proximal phalanx (11) and a distal phalanx (13), the proximal phalanges (21, 31, 41, 51) of each one of said four aligned fingers being hinged to said palm (00) in respective axes of rotation (240, 340, 440, 540) and the proximal phalanx (11) of said fifth finger being hinged to said metacarpus (10) in a respective axis of rotation (140);
a motor (100);
a plurality of bevel gear differential stages which transmit motion from said motor (100) to said aligned fingers and to said opposable finger, characterized in that said motor (100) is configured to directly drive only a first planet carrier of a first differential stage;
said plurality of differential stages comprises a first differential stage having a first planet carrier moved by said motor (100) and sun gears moving a second planet carrier of a second differential stage and a fifth planet carrier of a fifth differential stage, sun gears of said second differential stage being integral to a third planet carrier of a third differential stage and a fourth planet carrier of a fourth differential stage,
sun gears of said third and fourth differential stages being configured so that they respectively engage with four gears (210, 310, 410, 510) having axes coincident with said respective axes of rotation (240, 340, 440, 540) between proximal phalanges (21, 31, 41, 51) of said aligned four fingers and said palm (00), and sun gears of a fifth differential stage being configured to respectively rotate said metacarpus (10) and a gear (110) having an axis coincident with said respective axis of rotation (140) between the proximal phalanx (11) of said fifth finger and said metacarpus (10).

2. The anthropomorphic robotic hand according to claim 1, wherein said plurality of differential stages are bevel gear differentials; an axis of rotation of the sun gears of the plurality of differential stages moved by said motor (100) is parallel to a direction taken by the four aligned fingers in an extended position;
a coupling between one of the sun gears (05) of the first differential stage and the second planet carrier of the second differential stage is obtained by means of spur gears;
a coupling between the motor and the first planet carrier of the first differential stage is accomplished by using a worm gear reducer.

3. The anthropomorphic robotic hand according to claim 1, wherein, inside at least one of said bevel gear differential stages, the sun gears present different diameters, so that tightening a torque is not uniformly distributed to said four aligned fingers.

4. The anthropomorphic robotic hand according to claim 3, wherein said diameters of said sun gears are configured so that the torque transmitted to the four aligned fingers is subdivided as follows: 25% for a forefinger and a ring finger, 35% for a middle finger, 15% for a little finger.

5. The anthropomorphic robotic hand according to claim 1, wherein the axes of rotation of said planet carriers of the third and fourth differential stages can be mounted inclined to connecting shafts of the sun gears of the second differential stage by interposing Cardan joints (161, 151) on the respective connecting shafts, which allow transmission of rotation between mutually inclined shafts.

6. The anthropomorphic robotic hand according to claim 1 wherein each of the four aligned fingers comprises a first (210, 310, 410, 510), a second (220, 320, 420, 520) and a third (230, 330, 430, 530) toothed pulley, having axes of rotation respectively coincident to the relative rotation axis between said proximal phalanges (21, 31, 41, 51) and said palm (00), between said middle phalanges (22, 32, 42, 52) and said proximal phalanges (21, 31, 41, 51) and between said distal phalanges (23, 33, 43, 53) and said middle phalanges (22, 32, 42, 52), said first (210, 310, 410, 510) and second (220, 320, 420, 520) toothed pulleys being idler with respect to their relative axes of rotation and being connected to each other by means of a toothed belt (211, 311, 411, 511), said third toothed pulleys (230, 330, 430, 530) being each one integral to their respective distal phalanx (23, 33, 43, 53) and being connected by means of toothed belts (221, 321, 421, 521) to said second gears (220, 320, 420, 520).

7. The anthropomorphic robotic hand according to claim 6, wherein said first toothed pulley of each of the four aligned fingers is conveniently made up of one gear integral to a respective toothed pulley.

8. The anthropomorphic robotic hand according to claim 6, wherein a shape of said phalanges (11, 12, 21, 22, 23, 31, 32, 33, 41, 42, 43, 51, 52, 53) of said metacarpus (10) and said palm (00) are such that the rotation allowed around all the respective axes of rotation is limited to values similar to the physiological ones of the respective components of the human hand.

9. The anthropomorphic robotic hand according to claim 8, wherein rotation around all the respective axes of rotation, is between 90° and 110° for the proximal phalanx, between 90° and 135° for the middle phalanx, and between 85° and 90° for the distal phalanx.

10. The anthropomorphic robotic hand according to claim 6, wherein the proximal phalanx (11) of said fifth finger has a flexion that can reach about 70°, the flexion of the distal phalanx (13) of said fifth finger can reach about 75°, and said metacarpus (10) can rotate of about 90°.

11. The anthropomorphic robotic hand according to claim 6, wherein axes of rotation between phalanges (140, 160, 240, 250, 260, 340, 350, 360, 440, 450, 460, 540, 550, 560) and at the axis of rotation (180) of the metacarpus (10) springs are provided which exert an elastic torque among various hinged elements.

12. The anthropomorphic robotic hand according to claim 1, further comprising a brake (141, 241, 341, 441, 551) which can be independently actuated in correspondence to each of said relative axes of rotation between said proximal phalanges and said palm and between said metacarpus and said palm.

13. The anthropomorphic robotic hand according to claim 1, wherein said proximal phalanges and a shaft are hinged where a cylinder coaxial to said shaft (240) is interposed, are made of elastic material, which allows a certain degree of adduction/abduction of the fingers.

* * * * *